United States Patent [19]

Ooka et al.

[11] Patent Number: 4,818,790
[45] Date of Patent: Apr. 4, 1989

[54] ROOM-TEMPERATURE-CURABLE RESIN COMPOSITION

[75] Inventors: Masataka Ooka, Nara; Shinichi Kuwamura, Izumi-ohtsu; Hiroshi Ozawa, Izumi-ohtsu; Hiroshi Ozawa, Izumi-ohtsu, all of Japan

[73] Assignee: Dainippon Ink and Chemicals, Inc., Tokyo, Japan

[21] Appl. No.: 770,059

[22] Filed: Aug. 28, 1985

[30] Foreign Application Priority Data

Aug. 31, 1984 [JP] Japan ................................. 59-180799
Mar. 30, 1985 [JP] Japan ................................. 60-67725

[51] Int. Cl.$^4$ ....................... C08L 39/00; C08L 33/02
[52] U.S. Cl. ..................................... 525/103; 525/100; 525/194; 525/207; 525/208; 525/209; 524/517; 524/555
[58] Field of Search ............... 525/100, 101, 103, 342, 525/208, 207, 194; 524/555, 517

[56] References Cited

U.S. PATENT DOCUMENTS

| | | |
|---|---|---|
| 2,949,445 | 8/1960 | Blake . |
| 3,547,766 | 12/1970 | Chu ...................................... 525/100 |
| 3,554,985 | 1/1971 | Fields et al. ........................ 260/78.5 |
| 3,759,915 | 9/1973 | Kottke ................................. 524/556 |
| 3,786,020 | 1/1974 | Emmons ............................. 525/385 |
| 3,984,382 | 10/1976 | Parekh et al. ......................... 526/15 |
| 4,032,487 | 6/1977 | Columbus ............................ 525/100 |
| 4,077,932 | 3/1978 | Columbus ............................ 260/29.6 |
| 4,292,362 | 9/1981 | Marwitz et al. ...................... 525/477 |
| 4,423,194 | 12/1983 | Löbach et al. ...................... 525/327.6 |
| 4,666,981 | 5/1987 | Doura et al. ......................... 525/100 |
| 4,670,521 | 6/1987 | Ooka et al. . |

Primary Examiner—Wilbert J. Briggs, Sr.
Attorney, Agent, or Firm—Sherman and Shalloway

[57] ABSTRACT

A room temperature-curable resin composition consisting essentially of (A) a vinyl polymer containing a basic nitrogen atom and (B) a compound containing both an epoxy group and a hydrolyzable silyl group in each molecule. The composition is especially useful as a paint, an adhesive, or a sealing agent.

12 Claims, No Drawings

ROOM-TEMPERATURE-CURABLE RESIN COMPOSITION

This invention relates to a novel and useful room temperature-curable resin composition comprising a specific vinyl polymer containing a basic nitrogen atom and a specific compound containing both an epoxy group and a hydrolyzable silyl group as essential ingredients and as required, a compound containing a silanol group and/or another compound containing a hydrolyzable silyl group, and a specific catalyst for hydrolysis-condensation. The composition gives a cured product having excellent weatherability and hardness, and is especially useful as a paint, an adhesive or a sealing agent.

A composition comprising a vinyl polymer containing a basic nitrogen atom as a base resin component and a polyepoxy compound as a curing agent has been known heretofore, and it has been generally recognized that such a composition cures easily at room temperature to give a cured product having excellent weatherability (Japanese Laid-Open Patent Publications Nos. 76338/1977 and 56423/1984).

It has recently been desired to develop outdoor paints or sealing agents which have a high level of weatherability and are maintenance-free. Cured products of conventional compositions of the aforesaid type greatly decrease in gloss or strength after outdoor exposure for about two years, and therefore have insufficient weatherability.

It is an object of this invention, therefore, to overcome various defects or problems, such as those mentioned above, associated with the prior art.

It has now been found in accordance with this invention that the incorporation of a compound containing both an epoxy group and a hydrolyzable silyl group in each molecule as a curing agent in a vinyl polymer containing a basic nitrogen atom affords a composition which gives a cured product having greatly enhanced weatherability and excellent hardness.

According to this invention, there is provided a room temperature-curable resin composition capable of giving a cured product having excellent weatherability and hardness, said composition consisting essentially of (A) a vinyl polymer containing a basic nitrogen atom (to be abbreviated as basic nitrogen) and (B) a compound containing both an epoxy group and a hydrolyzable silyl group in each molecule as essential ingredients with or without (C-1) a compound containing a silanol group and/or (C-2) a compound containing a hydrolyzable silyl group other than the compound (B) and optionally comprising (D) a catalyst for hydrolysis and condensation of the hydrolyzable silyl group.

The vinyl polymer (A) containing basic nitrogen denotes a vinyl polymer which contains at least one basic nitrogen, preferably at least two basic nitrogens, in each molecule, namely containing at least one amino group selected from primary, secondary and tertiary amino groups.

The vinyl polymer (A) can be prepared by known methods, for example (1) by (co)polymerizing a vinyl monomer containing any of the amino groups mentioned above [to be referred to as a vinyl monomer (a-1)] with or without another copolymerizable vinyl monomer (a-2), or (2) by reacting a vinyl polymer [to be referred to also as polymer (a-3)] containing a carboxylic anhydride group (to be abbreviated as an acid anhydride group) with a compound [to be abbreviated as compound (a-4)] containing at least one group capable of reacting with the acid anhydride group and at least one tertiary amino group in each molecule.

Typical examples of the amino-containing vinyl monomer (a-1) used in the preparation of the vinyl polymer (A) by the method (1) above include dialkylaminoalkyl (meth)acrylates such as dimethylaminoethyl (meth)acrylate, diethylaminoethyl (meth)acrylate, dimethylaminopropyl (meth)acrylate and diethylaminopropyl (meth)acrylate; N-dialkylaminoalkyl(meth)acrylamides such as N-dimethylaminoethyl(meth)acrylamide, N-diethylaminoethyl(meth)acrylamide, N-dimethylaminopropyl(meth)acrylamide and N-diethylaminopropyl(meth)acrylamide; and other (meth)acrylates such as t-butylaminoethyl (meth)acrylate, t-butylaminopropyl (meth)acrylate, aziridinylethyl (meth)acrylate, pyrrolidinylethyl (meth)acrylate and piperidinylethyl (meth)acrylate. Among these, the dialkylaminoalkyl(meth)acrylates and the N-dialkylaminoalkyl(meth)acrylamides are particularly preferred in view of, for example, curability.

Typical examples of the vinyl monomer (a-2) copolymerizable with the amino-containing vinyl monomer (a-1) include (meth)acrylate esters such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, lauryl (meth)acrylate, cyclohexyl (meth)acrylate, benzyl (meth)acrylate, 2-hydroxyethyl (meth)acrylate, 2-hydroxypropyl (meth)acrylate, 2-hydroxybutyl (meth)acrylate or 4-hydroxybutyl (meth)acrylate; dialkyl esters of unsaturated dibasic acids, such as dimethyl maleate, dimethyl fumarate, dibutyl fumarate or dimethyl itaconate; carboxyl group-containing vinyl monomers such as (meth)acrylic acid, monobutyl maleate, monobutyl fumarate, crotonic acid, maleic acid, fumaric acid or itaconic acid; acid anhydride group-containing vinyl monomers such as maleic anhydride or itaconic anhydride; vinyl monomers containing a carboxylic acid amide group such as (meth)acrylamide, N,N-dimethyl (meth)acrylamide, N-alkoxymethyl(meth)acrylamide, diacetone (meth)acrylamide or N-methylol(meth)acrylamide; vinyl monomers containing a sulfonamide group such as p-styrenesulfonamide, N-methyl-p-styrenesulfonamide or N,N-dimethyl-p-styrenesulfonamide; cyano group-containing vinyl monomers such as (meth)acrylonitrile; vinyl monomers containing a phosphate ester bond, which are the condensation products of hydroxyalkyl esters of alpha, beta-ethylenically unsaturated carboxylic acids, such as hydroxyalkyl (meth)acrylates, and phosphoric acid or phosphate esters; sulfonic acid group-containing vinyl monomers such as p-styrenesulfonic acid or 2-acrylamido-2-methyl-propanesulfonic acid; vinyl esters such as vinyl acetate, vinyl benzoate or "Veova" (a tradename for vinyl esters produced by Shell Chemical Co., Netherlands); (per)fluoroalkyl group-containing vinyl monomers such as "Viscoat 8F, 8FM, 3F or 3FM" [a trade name for fluorine-containing (meth)acrylic monomers produced by Osaka Organic Chemical Industry, Ltd.], perfluorocyclohexyl (meth)acrylate, di-perfluorocyclohexyl fumarate or N-isopropyl perfluorooctanesulfonamidoethyl (meth)acrylate; halogenated olefins such as vinyl chloride, vinylidene chloride, vinyl fluoride, vinylidene fluoride, or chlorotrifluoroethylene; and aromatic vinyl monomers such as styrene, alpha-methylstyrene, p-tert-butylstyrene or vinyltoluene.

To prepare the vinyl polymer (A) from the various monomers exemplified above, 0.5 to 100% by weight, preferably 1 to 70% by weight, of the amino group-containing vinyl monomer (a-1) is copolymerized with 99.5 to 0% by weight, preferably 99 to 30% by weight, of the other vinyl monomer (a-2) copolymerizable with the amino-containing vinyl monomer (a-1).

By using the carboxyl group-containing monomer or the monomer containing a phosphate ester bond mentioned above together as the other vinyl monomer (a-2), the carboxyl group or the phosphate ester bond can be introduced into the vinyl polymer (A). By using such a vinyl polymer (A), the curability of the composition of this invention is further increased.

Any known polymerization method can be applied to the preparation of the vinyl polymer (A) from the various monomers cited above, but the solution radical polymerization method is simplest and most convenient.

Typical solvents used in this polymerization method include, for example, hydrocarbons such as toluene, xylene, cyclohexane, n-hexane or octane; alcohols such as methanol, ethanol, isopropanol, n-butanol, isobutanol, sec-butanol or ethylene glycol monomethyl ether; esters such as methyl acetate, ethyl acetate, n-butyl acetate or amyl acetate; and ketones such as acetone, methyl ethyl ketone, methyl isobutyl ketone or cyclohexanone. They may be used either singly or in combination.

The polymerization may be carried out in a customary manner using such a solvent and various known radical polymerization initiators such as azo compounds or peroxides. As required, a chain transfer agent such as laurylmercaptan, octylmercaptan, 2-mercaptoethanol, octyl thioglycollate, 2-mercaptopropionic acid or alpha-methylstyrene dimer may be used for molecular weight controlling.

The vinyl polymer (a-3) containing an acid anhydride group used in the preparation of the vinyl polymer (A) by the method (2) can be prepared by copolymerizing a monomer containing an acid anhydride group such as maleic anhydride or itaconic anhydride with a monomer copolymerizable with it in a solvent (the same as exemplified above excepting alcohols) in the presence of a radical initiator. The other vinyl monomers copolymerizable with the amino-containing vinyl monomer (a-1) which are exemplified above with regard to the method (1), excepting those containing a hydroxyl group, may be used as the copolymerizable monomer in the preparation of the vinyl polymer (a-3).

The suitable amount of the monomer containing an acid anhydride group is 0.5 to 50% by weight, preferably 1 to 20% by weight, in view of weatherability and alkali resistance. The suitable amount of the other copolymerizable monomer is in the range of 99.5 to 50% by weight, preferably 99 to 80% by weight.

When the above-exemplified carboxyl group-containing monomer or phosphate ester bond-containing monomer is used in combination with other copolymerizable monomers, the time required for reaction with the compound (a-4) having a group containing both active hydrogen capable of reacting with the acid anhydride (to be abbreviated as the active hydrogen-containing group) and a tertiary amino group can be shortened, and the curability of the composition of this invention can be further increased. The joint use of the carboxyl-containing or phosphate ester bond-containing monomer is especially preferred.

The compound (a-4) denotes a compound containing a hydroxyl group, a primary or secondary amino group, a thiol group, etc. as the active hydrogen-containing group. Alcohols having a tertiary amino group and primary or secondary amines having a tertiary amino group are most preferred as the compound (a-4).

Typical examples of the amino alcohols are adducts of secondary amines and epoxy compounds. Typical examples of the secondary amines include dimethylamine, diethylamine, dipropylamine, dibutylamine, ethyleneimine, morpholine, piperazine, piperidine, pyrrolidine, and amino alcohols containing a secondary amino group obtained by the addition reaction between primary amines such as methylamine, ethylamine or butylamine and mono- or poly-epoxy compounds. Typical examples of the epoxy compounds include monoepoxy compounds such as ethylene oxide, propylene oxide, butylene oxide, dodecene oxide, styrene oxide, cyclohexene oxide, butyl glycidyl ether, phenyl glycidyl ether, glycidyl p-tert-butylbenzoate and "Cardura E-10" (a trade name for a glycidyl ester of a branched fatty acid produced by Shell Chemical Co. of Netherlands); polyglycidyl ethers of polyhydric alcohols (polyols), such as ethylene glycol diglycidyl ether, neopentyl glycol diglycidyl ether, 1,6-hexanediol diglycidyl ether, a diglycidyl ether of bisphenol A and a triglycidyl ether of glycerol; polyglycidyl esters of polycarboxylic acids, such as diglycidyl phthalate, diglycidyl isophthalate and diglycidyl adipate; epoxy resins (polyepoxy compounds) such as diglycidyl ethertype epoxy resins from bisphenol A or F, novolak-type epoxy resins and hydantoin ring-containing epoxy resins; a glycidyl ester ether of p-hydroxybenzoic acid; and vinyl copolymers having epoxy groups in the side chain.

Typical examples of the amino alcohols containing a tertiary amino group obtained by reacting such secondary amines with such epoxy compounds include dimethylaminoethanol, diethylaminoethanol, di-n-propylaminoethanol, di-iso-propylaminoethanol, di-n-butylaminoethanol, N-(2-(hydroxyethyl)morpholine, N-(2-hydroxyethyl)pyrrolidine, N-(2-hydroxyethyl)-aziridine, N,N-dimethyl-2-hydroxypropylamine, N,N-diethyl-2-hydroxypropylamine, triethanolamine or tripropanolamine. As the amino alcohols containing a tertiary amino group, addition-reaction products between amino alcohols such as ethanolamine or propanolamine and (meth)acrylate monomers having a tertiary amino group such as dimethylaminoethyl (meth)acrylate or diethylaminoethyl (meth)acrylate, and vinyl copolymers containing both a tertiary amino group and a hydroxyl group in the side chain obtained by the copolymerization of (meth)acrylate monomers containing a tertiary amino group and hydroxyl group-containing monomers such as beta-hydroxyethyl (meth)acrylate can also be used.

Typical examples of the primary or secondary amines containing a tertiary amino group include N,N-dialkyl-1,3-propylenediamines such as N,N-dimethyl-1,3-propylenediamine and N,N-diethyl-1,3-propylenediamine; N,N-dialkyl-1,4-tetramethylenediamines such as N,N-dimethyl-1,4-tetramethylenediamine and N,N-diethyl-1,4-tetramethylenediamine; N,N-dialkyl-1,6-hexamethylenediamines such as N,N-dimethyl-1,6-hexamethylenediamine and N,N-diethyl-1,6-hexamethylenediamine; N,N,N'-trialkylalkylenediamines such as N,N,N'-trimethyl-1,3-propylenediamine, N,N,N'-triethyl-1,3-propylenediamine, N,N,N'-trimethyl-1,4-tetramethylenediamine and N,N,N'-trimethyl-1,6-hexamethylenediamine; N-alkylpiperazines such as N-methylpiperazine and N-ethylpiperazine; and adducts between the above-exemplified (meth)acrylate monomers containing a tertiary amino group and ethylenediamine, propylenediamine, hexamethylenediamine, piperazine, methylamine, ethylamine, propylamine, or ammonia.

From the viewpoint of, for example, curability, N,N-dialkylaminoethanols and N,N-dialkylalkylenediamines are preferred as the compound (a-4).

To obtain the vinyl polymer (A) containing basic nitrogen as a base resin component of the composition of this invention from the polymer (a-3) and the compound (a-4), the two compounds are mixed in such proportions that the proportion of the active hydrogen-containing group in the compound (a-4) is about 0.5 to 3 equivalents per equivalent of the acid anhydride group of the polymer (a-3), and the mixture is reacted at a temperature ranging from room temperature to about 150° C.

When a compound containing both a tertiary amino group and a primary amino group, such as N,N-dimethyl-1,3-propylenediamine, is used as the compound (a-4), the addition reaction between the compounds (a-3) and (a-4) first gives a polymer [I] containing carboxyl groups and N-mono-substituted amide groups as schematically shown below.

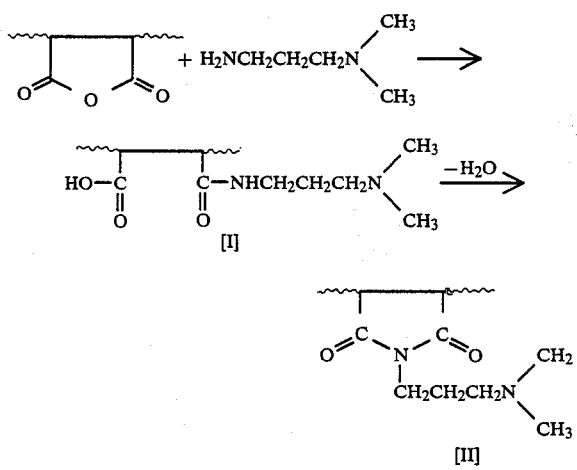

The polymer [I] obtained may be directly used as the base resin component (A) of the composition of this invention. However, for use in applications which require cured coated films having soiling resistance and alkali resistance, it is preferred to maintain the polymer [I] at a temperature of about 70° to 150° C. to dehydrocyclize it, and use the resulting polymer [II] having an imide ring as the base resin component (A).

The suitable number average molecular weight of the vinyl polymer (A) is in the range of 500 to 50,000, preferably 2,000 to 30,000.

The compound (B) containing both an epoxy group and a hydrolyzable silyl group in each molecule may typically include vinyl polymers containing both of these reactive groups and silane coupling agents containing an epoxy group.

The hydrolyzable silyl group, as used herein, denotes a hydrolyzable reactive group represented by the general formula

wherein $R_1$ represents a hydrogen atom or a monovalent organic group such as an alkyl, aryl or aralkyl group, $R_2$ represents a halogen atom or an alkoxy, acyloxy, phenoxy, iminoxy or alkenyloxy group, and $a$ is a natural number of 0, 1 or 2.

Examples of the hydrolyzable silyl group include halosilyl groups, alkoxysilyl groups, acyloxysilyl groups, a phenoxysilyl group, an iminoxysilyl group, and alkenyloxysilyl groups.

The vinyl polymer (B) having both of the above reactive groups may be prepared by applying any known methods. Examples of simple methods include (i) the radical solution copolymerization of vinyl monomers having a hydrolyzable silyl group, such as gamma-(meth)acryloyloxy propyltrimethoxysilane, gamma-(meth)acryloyloxy propylmethyldimethoxysilane, gamma-(meth)acryloyloxypropyl triisopropenyloxysilane, gamma-(metha)acryloyloxy propyltriiminoxysilane, vinyltrimethoxysilane, vinyltriethoxysilane, vinyl(tris-betamethoxyethoxy)silane, vinyltriacetoxysilane and vinyltrichlorosilane, vinyl monomers having an epoxy group such as (beta-methyl)glycicdyl (meth)acrylate, allyl glycidyl ether, di(beta-methyl)glycidyl maleate and di(beta-methyl)glycidyl fumarate, and as required the aforesaid other vinyl monomers copolymerizable with the amino-containing vinyl monomer; and (ii) radical solution (co)polymerization of a monomeric mixture comprising the aforesaid epoxy group-containing vinyl monomer as an essential ingredient in the presence of a chain transfer agent such as gamma-mercaptopropyltrimethoxysilane, gamma-mercaptopropyltriethoxysilane, gamma-mercaptopropylmethyldimethoxysilane, gamma-mercaptopropyltriisopropenyloxysilane or gamma-mercaptopropyltriiminoxysilane.

The suitable number average molecular weight of the vinyl polymer (B) obtained by the method (i) or (ii) is within the range of 500 to 50,000, preferably 1,000 to 30,000.

In the preparation of the compound (B) by the method (ii), it is of course possible to use together the aforesaid monomers having a hydrolyzable silyl group.

Typical examples of the epoxy group-containing silane coupling agents include gamma-glycidoxypropyltrimethoxysilane, gamma-glycidoxypropyltriethoxysilane, gamma-glycidoxypropylmethyldiethoxysilane, gamma-glycidoxypropyltriisopropenyloxysilane, gamma-glycidoxypropyltriiminoxysilane, an adduct between gamma-isocyanatopropyltriisopropenyloxysilane and glycidol, an adduct between gamma-isocyanatopropyltrimethoxysilane and glycidol, and an adduct between gamma-aminopropyltrimethoxysilane and a diepoxy compound. Gamma-Glycidoxypropyltrialkoxy-silanes gamma-Glycidoxypropyltriisopropenyloxysilane, are particularly preferred in view of, for example, curability and economy.

Typical examples of the compound (C-1) containing a silanol group include low-molecular-weight silanol compounds obtained by almost completely hydrolyzing halosilanes such as methyltrichlorosilane, phenyltrichlorosilane, ethyltrichlorosilane, dimethyldichlorosilane or diphenyldichlorosilane; polysiloxanes having a silanol group obtained by dehydrocondensing these silanol compounds; polysiloxanes having a silanol group obtained by hydrolyzing and condensing the aforesaid alkoxysilanes or alkenyloxysilanes; silicone resins having a silanol group at the terminals; silanol compounds having a cyclic siloxane structure typified, for example, by "Toray Silicone SH-6018" (a product of Toray Silicone Co., Ltd.).

The compound (C-2) containing a hydrolyzable silyl group and being free from an epoxy group denotes a low-molecular-weight compound or resin containing at least one hydrolyzable group of general formula [III] but not containing any epoxy group. Accordingly, the aforesaid compounds (B) do not fall into the category of the compounds (C-2).

Typical examples of the compound (C-2) include alkoxysilanes such as tetramethoxysilane, trimethoxysilane, tetraethoxysilane, triethoxysilane, tetrapropoxysilane, tetrabutoxysilane, tetraoctoxysilane, tetrakis(2-methoxyethoxy)silane, tetrabenzyloxysilane, methyltrimethoxysilane, ethyltrimethoxysilane, methyltriethoxysilane, phenyltriethoxysilane, dimethyldimethoxysilane, dimethyldiethoxysilane, diphenyldiethoxysilane, gammaisocyanatopropyltrimethoxysilane, vinyltrimethoxysilane, vinyltriethoxysilane, gamma-chloropropyltrimethoxysilane, gamma-mercaptopropyltrimethoxysilane, gamma-aminopropyltrimethoxysilane and gamma-(2-aminoethyl)aminopropyltrimethoxysilane; alkenyloxysilanes such as tetrapropenyloxysilane, phenyltriisopropenyloxysilane, gamma-isocyanatopropyltriisopropenyloxysilane, gamma-methacryloxypropyltriisopropenyloxysilane, gamma-mercaptopropyltriisopropenyloxysilane and tetrabutenyloxysilane; acyloxysilanes such as tetraacetoxysilane, methyltriacetoxysilane, gamma-mercaptopropyltriacetoxysilane, tetrapropionyloxysilane, phenyltripropionyloxysilane and vinyltriacetoxysilane; halosilanes such as tetrachlorosilane, phenyltrichlorosilane, tetrabromosilane and benzyltribromosilane; iminoxysilanes such as tetrakis(dimethyliminoxy)silane, methyltris(dimethyliminoxy)silane, tetrakis(methyl-ethyliminoxy)silane, gamma-methacryloxypropyltris(dimethyliminoxy)silane and gamma-mercaptopropyltris(dimethyliminoxy)silane; siloxane oligomers having an alkoxysilyl group obtained by partial hydrolysis and condensation of the above-exemplified alkoxysilanes; siloxane oligomers having an alkenyloxy group obtained by partial hydrolysis and condensation of the above-exemplified alkenyloxysilanes; homopolymers of vinyl monomers containing a hydrolyzable silyl group, such as gamma-methacryloxypropyltrimethoxysilane, vinyltriethoxysilane, vinyltriacetoxysilane and gamma-methacryloxypropyltriacetoxysilane, or copolymers of the aforesaid monomers with other monomers copolymerizable with the above monomers; vinyl polymers having a hydrolyzable silyl group at the terminals obtained by (co)polymerizing vinyl monomers optionally including the above-exemplified vinyl monomers having a hydrolyzable silyl group using mercaptans having a hydrolyzable silyl group such as gamma-mercaptopropyltrimethoxysilane, gamma-mercaptopropyltriisopropenyloxysilane or gamma-mercaptopropyltriacetoxysilane exemplified above as a chain transfer agent; resins obtained by reacting polyhydroxy compounds such as polyhydric alcohols, hydroxyl-containing acrylic resins, hydroxylcontaining alkyd resins, hydroxyl-containing polyester resins or polyether polyols with compounds containing a hydrolyzable silyl group such as the alkoxysilanes exemplified above in accordance with such a method as disclosed in the specification of Japanese Laid-Open Patent Publication No. 168625/1983; adducts formed between unsaturated compounds such as low molecular weight polyallyl compounds (e.g., diallyl succinate, triallyl trimellitate or diallyl phthalate), vinyl polymers containing an unsaturated bond, polyester resins containing an unsaturated bond or alkyd resins containing an unsaturated bond and hydrosilanes containing a hydrolyzable silyl group such as trimethoxysilane or triethoxysilane; adducts formed between epoxy group-containing compounds such as vinyl polymers containing an epoxy group and epoxy resins and the above-exemplified mercaptosilanes; resins having a urethane linkage obtained by reacting compounds containing an isocyanate group and a hydrolyzable silyl group such as gamma-isocyanatopropyltrimethoxysilane and gamma-isocyanatopropyltriisopropenyloxysilane with the polyhydroxy compounds exemplified above; and silicone resins having a hydrolyzable silyl group at the terminal position of the molecule.

The composition of this invention has good curability even in the absence of a curing catalyst. When it is desired to increase its curability further, the catalyst (D) for hydrolysis and condensation of the hydrolyzable silyl group may be incorporated in the composition.

Typical examples of the catalyst (D) include basic compounds such as sodium hydroxide, lithium hydroxide, potassium hydroxide and sodium methylate; metal compounds such as tetraisopropyl titanate, tetrabutyl titanate, tin octoate, lead octoate, cobalt octoate, zinc octoate, calcium octoate, lead naphthenate, cobalt naphthenate, dibutyltin diacetate, dibutyltin dioctate, dibutyltin dilaurate and dibutyltin maleate; and acidic compounds such as p-toluenesulfonic acid, trichloroacetic acid, phosphoric acid, monoalkylphosphoric acids, dialkylphosphoric acids, monoalkylphosphorous acids and dialkylphosphorous acids.

To prepare the composition of this invention from the components (A) to (D), the components (A) and (B) are mixed in such proportions that the proportion of the epoxy group in the component (B) is about 0.2 to 5 equivalents per equivalent of the reactive groups present in the component (A), e.g., the amino group, the carboxyl group and/or the phosphate ester bond; or 1 to 1,000 parts by weight, preferably 2 to 500 parts by weight, of the component (C) is mixed with 100 parts by weight of the components (A) and (B) combined; or about 0.01 to 10% by weight, based on the total amount of the components (A), (B) and (C), of the component (D) is added to a mixture of the three components (A), (B) and (C).

The composition of this invention may further include various conventional additives such as organic or inorganic pigments, levelling agents, antiflooding agents, ultraviolet absorbers or antioxidants; cellulose derivatives such as nitrocellulose or cellulose acetatebutyrate; and various resins such as chlorinated polyethylene, chlorinated polypropylene, petroleum resins and chlorinated rubbers.

The composition of this invention may be used as a solventless composition or as a solvent-based composition containing a solvent.

The resulting room temperature-curable resin composition of this invention so obtained is coated in a customary manner on various substrates, and then dried for several days in a customary manner. As a result, a cured product having particularly excellent weatherability as well as superior hardness is obtained.

Accordingly, the resin composition of this invention can be used widely as a coating agent for automobile repair, woodwork, building, and application to building materials, glass and various plastic articles, and also as a sealing agent or an adhesive.

The following Referential Examples, Examples and Comparative Examples illustrate the present invention more specifically. In the following examples, all parts and percentages are by weight unless otherwise indicated.

REFERENTIAL EXAMPLE 1

Preparation of a vinyl polymer (A) containing basic nitrogen:

A reactor equipped with a stirrer, a thermometer, a reflux condenser and a nitrogen introduction tube was charged with 392 parts of toluene and 408 parts of isobutanol. In an atmosphere of nitrogen, the temperature of the reactor was raised to 80° C., and a mixture composed of 900 parts of methyl methacrylate, 100 parts of dimethylaminoethyl methacrylate, 5 parts of azobisisobutyronitrile (AIBN), 5 parts of tert-butyl peroxyoctoate (TBPO) and 200 parts of toluene was added dropwise over 3 hours. After the addition, the mixture was maintained at the same temperature for 2 hours, and a mixture composed of 5 parts of AIBN, 448 parts of toluene and 37 parts of isobutanol was added dropwise over 1 hour. Thereafter, the mixture was maintained at the same temperature for 12 hours to give a solution of a vinyl polymer (A) containing a tertiary amino group and having a number average molecular weight of 12,000. The solution had a nonvolatile content (NV) of 40%. The resulting polymer solution is designated as polymer (A-1).

REFERENTIAL EXAMPLES 2-5

Preparation of vinyl polymers containing basic nitrogen:

Referential Example 1 was repeated except that the proportion of the monomers used were changed as indicated in Table 1. The resulting vinyl polymers (A) having a tertiary amino group are designated as polymers (A-2) to (A-5).

TABLE 1

| | Referential Example | | | | |
|---|---|---|---|---|---|
| | 1 | 2 | 3 | 4 | 5 |
| Proportions of the monomers (parts) | | | | | |
| Styrene | — | 200 | 300 | — | 200 |
| Methyl methacrylate | 900 | 300 | 400 | 880 | 300 |
| n-Butyl methacrylate | — | 200 | 200 | — | 200 |
| n-Butyl acrylate | — | 100 | — | — | 190 |
| Dimethylaminoethyl methacrylate | 100 | — | — | 100 | 100 |
| Dimethylaminoethyl acrylate | — | 150 | — | — | — |
| N—dimethylaminopropyl-methacrylamide | — | — | 80 | — | — |
| Acrylic acid | — | 50 | — | — | — |
| Methacrylic acid | — | — | 20 | — | — |
| Fumaric acid | — | — | — | 20 | — |
| Phosphoric acid ester of beta-hydroxyethyl methacrylate | — | — | — | — | 10 |
| NV (%) | | | | 40 | |
| Designation of the polymer solution (A) | A-1 | A-2 | A-3 | A-4 | A-5 |

REFERENTIAL EXAMPLE 6

Preparation of a vinyl polymer (A) containing basic nitrogen:

The same reactor as used in Referential Example 1 was charged with 300 parts of toluene and 400 parts of butyl acetate, and the temperature of the reactor was raised to 110° C. in an atmosphere of nitrogen. A mixture composed of 100 parts of styrene, 400 parts of methyl methacrylate, 300 parts of n-butyl methacrylate, 130 parts of n-butyl acrylate, 30 parts of acrylic acid, 40 parts of maleic anhydride, 10 parts of AIBN, 5 parts of TBPO, 5 parts of tert-butyl peroxybenzoate (TBPB) and 300 parts of toluene was added dropwise over 3 hours. After the addition, the mixture was maintained at the same temperature for 15 hours to give a solution of a vinyl polymer (a-3) containing both an acid anhydride and a carboxyl group and having a number average molecular weight of 10,000. The polymer solution had an NV of 50%, and is designated as polymer (a-3-1).

The temperature of the polymer solution was lowered to 70° C., and 40 parts of N,N-dimethylaminoethanol was added. The mixture was maintained at this temperature for 5 hours, and 270 parts of n-butanol was added to give a solution of a vinyl polymer (A) containing both a tertiary amino group and a carboxyl group which had an NV of 45%. The polymer solution is designated as polymer (A-6).

REFERENTIAL EXAMPLE 7

Preparation of a vinyl polymer (A) containing basic nitrogen:

Referential Example 6 was repeated except that itaconic anhydride was used instead of maleic anhydride. There was obtained a solution of a vinyl polymer (A) containing both a tertiary amino group and a carboxyl group which had an NV of 45%. This polymer solution is designated as polymer (A-7).

REFERENTIAL Example 8

Preparation of a vinyl polymer (A) containing basic nirogen:

One thousand parts of the polymer solution (a-3-1) obtained in Referential Example 6 was heated to 90° C. in an atmosphere of nitrogen. To the solution was added 20.8 parts of N,N-dimethyl-1,3-propylenediamine. The mixture was maintained at the same temperature for 6 hours to perform dehydration reaction. As a result, the acid value decreased to 12.5 from its initial value of 22.7. This shows that about 90% of the amide linkage formed was converted to an imide ring.

IR spectral analysis showed that the absorption assigned to the amide linkage disappeared, and an absorption at 1,700 cm$^{-1}$ assigned to the imide ring was observed.

To the resulting solution of a polymer having an imide ring was added 135 parts of n-butanol to give a solution of a polymer (A) which had an NV 45% and a Gardener color number of less than 1. The polymer solution is designated as polymer (A-8).

REFERENTIAL EXAMPLE 9

Preparation of a compound (B) containing both an epoxy group and a hydrolyzable silyl group in each molecule:

The same reactor as used in Referential Example 1 was charged with 870 parts of toluene and 300 parts of sec-butanol, and the temperature of the reactor was raised to 90° C. in an atmopshere of nitrogen. A mixture composed of 310 parts of n-butyl methacrylate, 100 parts of n-butyl acrylate, 500 parts of glycidyl methacrylate, 50 parts of gamma-methacryloxy propyltrimethyoxysilane, 50 parts of TBPO and 170 parts of toluene and a mixture composed of 40 parts of gamma-mercaptopropyltrimethoxysilane and 160 parts of toluene were added dropwise over 6 hours. After the addition, the mixture was maintained at the same temperature for 15 hours to give a solution of a polymer (B) containing both an epoxy group and a methoxysilyl group and having a number average molecular weight of 4,200 which had an NV of 40%. The polymer solution is designated as polymer (B-1).

REFERENTIAL EXAMPLE 10

Preparation of a compound (B) having both an epoxy group and a hydrolyzable silyl group in each molecule:

The same reactor as in Referential Example 1 was charged with 1,100 of toluene and 300 parts of sec-butanol, and the temperature of the reactor was raised to 100° C. in an atmosphere of nitrogen. A mixture composed of 100 parts of methyl methacrylate, 200 parts of n-butyl methacrylate, 100 parts of iso-butyl acrylate, 400 parts of glycidyl methacrylate, 200 parts of gamma-methacryloxypropyltrimethoxysilane, 50 parts of TBPO, 5 parts of TBPB and 100 parts of toluene was added dropwise over 8 hours. After the addition, the mixture was maintained at the same temperature for 15 hours to give a solution of a polymer (B) containing both an epoxy group and a methoxysilyl group and having a number average molecular weight of 4,500 which had an NV of 40%. The polymer solution was designated as (B-2).

REFERENTIAL EXAMPLE 11

Preparation of a compound (C-2) containing a hydrolyzable silyl group but being free from an epoxy group:

The same reactor as used in Referential Example 1 was charged with 800 parts of toluene and 500 parts of n-butanol, and the temperature of the reactor was raised to 110° C. in an atmosphere of nitrogen. A mixture composed of 200 parts of styrene, 300 parts of n-butyl methacrylate, 500 parts of gamma-methacryloxypropyltrimethoxysilane, 40 parts of TBPO, 5 parts of TBPB and 200 parts of toluene was added dropwise over 8 hours. After the addition, the mixture was maintained at the same temperature for 15 hours to give a solution of a vinyl polymer (C-2) containing a methoxysilyl group and having a number average molecular weight of 5,000 which had an NV of 40%. The solution is designated as compound (C-2-1).

REFERENTIAL EXAMPLE 12

Preparation of a compound (C-2) containing a hydrolyzable silyl group and being free from an epoxy group:

Referential Example 11 was repeated except that gamma-methacryloxypropyltriisopropenyloxysilane was used instead of the gamma-methacryloxypropyltrimethoxysilane. A polymer (C-2) having an isopropenyloxysilyl group was obtained. It is designated as compound (C-2-2).

REFERENTIAL EXAMPLE 13

Preparation of a compound (C-2) containing a hydrolyzable silyl group and being free from an epoxy group:

The same reactor as used in Referential Example 1 was charged with 134 parts (1 mole) of trimethylolpropane, 684 parts (6 moles) of epsilon-caprolactone and 0.04 part of tetrabutyl titanate, and the temperature of the mixture was raised to 180° C. in an atmosphere of nitrogen. The mixture was maintained at this temperature for 6 hours to give a 1:6 (by mole) trimethylolpropane/epsilon-caprolactone adduct. The temperature was then lowered to 90° C., and 936 parts of tetraethyl silicate (the equivalent ratio of tetraethyl silicate to hydroxyl groups=1.5) and 5.3 parts of tetrabutyl titanate were additionally fed, and the mixture was heated at 110° to 120° C. until the distillation of ethanol ceased (3 hours) to give a tetraethoxysilane-modified resin. This resin is designated as compound (C-2-3).

REFERENTIAL EXAMPLE 14

Preparation of a compound (C-2) containing a hydrolyzable silyl group and being free from an epoxy group:

The same reactor as used in Referential Example 1 was charged with 62 parts (1 mole) of ethylene glycol, 2280 parts (20 moles) of epsilon-caprolactone and 0.12 part of tetrabutyl titanate, and in an atmosphere of nitrogen, the temperature was raised to 180° C. The materials were reacted at this temperature for 6 hours to give an adduct of ethylene glycol and epsilon caprolactone in a mole ratio of 1:20. The temperature was then lowered to 90° C., 118 parts of butyl acetate, 410 parts of gamma-isocyanatopropyltrimethoxysilane and 0.14 part of tin octoate were added. The mixture was maintained at the above temperature for 10 hours to obtain a polyester resin containing a trimethoxysilyl group at both ends and having an NV of 70%. The resin is designated as compound (C-2-4).

REFERENTIAL EXAMPLE 15

Preparation of a compound (C-2) containing a hydrolyzable silyl group and being free from an epoxy group:

A reactor equipped with a stirrer, a thermometer, a nitrogen introducing tube and a condenser was charged with 157.4 parts of adipic acid, 300 parts of hexahydrophthalic anhydride, 203.8 parts of trimethylolpropane, 230 parts of neopentyl glycol and 200 parts of coconut oil fatty acid. In a stream of nitrogen, the temperature was gradually raised to 230° C. over 5 hours. The mixture was maintained at this temperature until its acid value reached 10 to perform dehydrocondensation and obtain an alkyd resin having a hydroxyl value of 125. Then, the temperature was lowered to 90° C., and 624 parts of butyl acetate, 456 parts of gamma-isocyanatopropyltrimethoxysilane and 0.07 part of tin octoate were added. The mixture was maintained at the above temperature for 10 hours to give an alkyd resin containing a trimethoxysilyl group and having an NV of 70%. The resin is designated as compound (C-2-5).

REFERENTIAL EXAMPLE 16

Preparation of a compound (C-1) containing a silanol group:

Reactor equipped with a stirrer, a thermometer and a reflux condenser was charged with 534 parts of methyltriethoxysilane, 162 parts of water and 0.5 part of 0.1N hydrochloric acid. With good stirring, the mixture was heated at 80° C. for 4 hours under reflux. Ethanol was distilled off to form a solution having an NV of 50%. The solution was further heated for 20 hours under reflux. The residual ethanol and water were distilled off under reduced pressure from the resulting solution to obtain a hydrolyzation-condensation product of methyltriethoxysilane as a white powder. It is designated as compound (C-1-1).

EXAMPLES 1–12 AND COMPARATIVE EXAMPLES 1–8

In each run, a white paint having a PWC of 40% was prepared in accordance with the formulations indicated in Table 2 (the numerals show parts by weight). It was diluted to a sprayable viscosity with a mixed solvent composed of toluene, xylene, n-butanol and Cellosolve acetate in a weight ratio of 40/20/30/10. The diluted paint was spray-coated on a zinc phosphate-treated steel panel to a dry thickness of about 50 micrometers, and then dried at room temperature for 7 days to obtain a cured coated film.

The coated films obtained were tested for weatherability and hardness by outdoor exposure for 2 years in Miyazaki Prefecture, Japan.

The results are also summarized in Table 2.

It is clearly seen from the results given in Table 2 that the cured coated films obtained from the room temperature-curable resin composition of this invention have excellent weatherability and hardness.

TABLE 2

| | Example | | | | | | | | | |
|---|---|---|---|---|---|---|---|---|---|---|
| | 1 | 2 | 3 | 4 | 5 | 6 | 7 | 8 | 9 | 10 |
| Component (A) | | | | | | | | | | |
| Polymer (A-1) | 100 | | | | | | | | | |
| Polymer (A-2) | | 100 | | | | | | | | |
| Polymer (A-3) | | | 100 | | | | | | | |
| Polymer (A-4) | | | | 100 | | | | | | |
| Polymer (A-5) | | | | | 100 | | | | | |
| Polymer (A-6) | | | | | | 100 | | | | |
| Polymer (A-7) | | | | | | | 100 | | | |
| Polymer (A-8) | | | | | | | | 100 | 100 | 100 |
| Component (B) | | | | | | | | | | |
| Polymer (B-1) | 18.2 | | | | | | 37.3 | | | |
| Polymer (B-2) | | 62.3 | | | | | | | | |
| gamma-glycidoxypropyltrimethoxysilane | | | 6.7 | 9.3 | | 12.4 | | 8.4 | 8.4 | 8.4 |
| gamma-glycidoxypropyltriisopropenyloxysilane | | | | | 8.9 | | | | | |
| Component (C) | | | | | | | | | | |
| Compound (C-2-1) | 100 | | | | | | | 200 | | |
| Compound (C-2-2) | | 100 | | | | | | | | |
| Compound (C-2-3) | | | 50 | | | | | | | |
| Compound (C-2-4) | | | | 100 | | | | | | |
| Compound (C-2-5) | | | | | 100 | | | | | |
| Tetrabutoxysilane | | | | | | 20 | | | | |
| "Ethyl Silicate 40" (*1) | | | | | | | 30 | | | |
| Compound (C-1-1) | | | | | | | | | 20 | |
| "Toray Silicone SH-6018" | | | | | | | | | | 20 |
| Component (D) Dibutyltin diacetate | 1 | | 1 | | | | 0.8 | | | |
| Glycerin polyglycidyl ether (*2) | | | | | | | | | | |
| Typaque CR-93" (*3) | 58.2 | 69.9 | 64.4 | 79.5 | 79.2 | 51.6 | 59.9 | 88.9 | 48.9 | 48.9 |
| Weatherability of the cured coated film (*4)(%) | 70 | 75 | 80 | 73 | 73 | 75 | 79 | 83 | 75 | 78 |
| Pencil hardness of the coated film | 3H | 3H | 2H | H | H | 2H | 3H | 3H | 2H | 2H |

| | Example | | Comparative Example | | | | | | | |
|---|---|---|---|---|---|---|---|---|---|---|
| | 11 | 12 | 1 | 2 | 3 | 4 | 5 | 6 | 7 | 8 |
| Component (A) | | | | | | | | | | |
| Polymer (A-1) | 100 | | 100 | | | | | | | |
| Polymer (A-2) | | | | 100 | | | | | | |
| Polymer (A-3) | | | | | 100 | | | | | |
| Polymer (A-4) | | | | | | 100 | | | | |
| Polymer (A-5) | | | | | | | 100 | | | |
| Polymer (A-6) | | | | | | | | 100 | | |
| Polymer (A-7) | | | | | | | | | 100 | |
| Polymer (A-8) | | 100 | | | | | | | | 100 |
| Component (B) | | | | | | | | | | |
| Polymer (B-1) | 18.2 | | | | | | | | | |
| Polymer (B-2) | | | | | | | | | | |
| gamma-glycidoxypropyltrimethoxysilane | | 8.4 | | | | | | | | |
| gamma-glycidoxypropyltriisopropenyloxysilane | | | | | | | | | | |
| Component (C) | | | | | | | | | | |
| Compound (C-2-1) | | | | | | | | | | |
| Compound (C-2-2) | | | | | | | | | | |
| Compound (C-2-3) | | | | | | | | | | |
| Compound (C-2-4) | | | | | | | | | | |
| Compound (C-2-5) | | | | | | | | | | |
| Tetrabutoxysilane | | | | | | | | | | |
| "Ethyl Silicate 40" (*1) | | | | | | | | | | |
| Compound (C-1-1) | | | | | | | | | | |
| "Toray Silicone SH-6018" | | | | | | | | | | |
| Component (D) Dibutyltin diacetate | 0.5 | | | | | | | | | |
| Glycerin polyglycidyl ether (*2) | | | 3.7 | 10.2 | 4.1 | 5.7 | 4.1 | 7.6 | 7.6 | 5.1 |
| Typaque CR-93" (*3) | 31.5 | 35.6 | 29.1 | 33.5 | 29.4 | 30.5 | 29.4 | 35.1 | 35.1 | 33.5 |
| Weatherability of the cured coated film (*4)(%) | 60 | 71 | 30 | 32 | 35 | 25 | 30 | 28 | 30 | 35 |

TABLE 2-continued

| Pencil hardness of the coated film | 2H | 2H | H | H | H | H | F | H | H | H |

Note:
(*1): Partial hydrolyzation-condensation product of tetraethoxysilane containing an ethoxy-silyl group, a product of Colcoat Co., Ltd.
(*2): Polyepoxy compound having an epoxy equivalent of 145.
(*3): Rutile titanium oxide made by Ishihara Sangyo Kaisha, Ltd.
(*4): The gloss value of the cured coated film exposed outdoors for 2 years in Miyazaki Prefecture, Japan was divided by the gloss value of the cured coated film before exposure, and the quotient was multiplied by 100. The product represents gloss retention (%). The larger this value, the better the weatherability of the cured coated film.

What is claimed is:

1. A room temperature-curable resin composition consisting essentially of (A) an organic solvent solution of a vinyl polymer containing a basic nitrogen atom and having at least one reactive group selected from the group consisting of amine groups, carboxyl groups, phosphate ester bonds and mixtures thereof and (B) a compound containing both an epoxy group and a hydrolyzable silyl group in each molecule, said vinyl polymer (A) being a polymer obtained by polymerizing (a-1) at least one vinyl monomer containing at least one tertiary amino group with or without (a-2) another copolymerizable monomer, or a polymer obtained by reacting (a-3 a vinyl polymer containing a carboxylic anhydride group with (a-4) a compound containing both at least one group capable of reacting with the carboxylic anhydride group and at least one tertiary amino group in each molecule, said components (A) and (B) being mixed in such proportions that the proportion of the epoxy group in the component (B) is about 0.2 to 5 equivalents per equivalent of said reactive groups in the component (A).

2. A room temperature-curable resin composition consisting essentially of (A) an organic solvent solution of a vinyl polymer containing a basic nitrogen atom and having at least one reactive group selected from the group consisting of amine groups, carboxyl groups, phosphate ester bonds and mixtures thereof, (B) a compound containing both an epoxy group and a hydrolyzable silyl group in each molecule, and (C) a compound (c-1) containing a silanol group and/or a compound (c-2) containing a hydrolyzable silyl group other than the compound (B), said vinyl polymer being a polymer (A) obtained by polymerizing (a-1) at least one vinyl monomer Containing at least one tertiary amino group, with or without (a-2) another copolymerizable monomer, or a polymer obtained by reacting (a-3) a vinyl polymer containing a carboxylic anhydride group with (a-4) a compound containing both at least one group capable of reacting with the carboxylic anhydride group and at least one tertiary amino group in each molecule, said components (A), (B) and (C) being mixed in such proportions that the proportion of the epoxy group in the component (B) is about 0.2 to 5 equivalents per equivalent of said reactive groups in the component (A), and the weight ratio of component (C) to total solids of component (A) and component (B) is 1 to 1,000:100.

3. A room temperature-curable resin composition consisting essentially of (A) an organic solvent solution of a vinyl polymer containing a basic nitrogen atom and having at least one reactive group selected from the group consisting of amine groups, carboxyl groups, phosphate ester bonds and mixtures thereof, (B) a compound containing both an epoxy group and a hydrolyzable silyl group in each molecule, (C) a compound (c-1) containing a silanol group and/or a compound (c-2) containing a hydrolyzable silyl group other than the compound (B), and (D) a catalyst for hydrolysis and condensation of the hydrolyzable silyl group, said vinyl polymer (A) being a polymer obtained by polymerizing (a-1) at least one vinyl monomer containing at least one teritiary amino group, with or without (a-2) another copolymerizable monomer, or a polymer obtained by reacting (a-3) a vinyl polymer containing a carboxylic anhydride group with (a-4) a compound containing both at least one group capable of reacting with the carboxylic anhydride group and at least one tertiary amino group in each molecule, said components (A), (B), (C) and (D) being mixed in such proportions that the proportion of the epoxy group in the component (B) is about 0.2 to 5 equivalents per equivalent of said reactive groups in the component (A): the weight ratio of component (C) to total solids of the component (A) and (B) is 1 to 1,000:100; and the content of a component (D) is 0.001 to 10% by weight based on the total amount of the components (A), (B) and (C).

4. The composition of any one of claims 1 to 3 wherein the vinyl polymer (A) is a polymer obtained by copolymerizing (a-1) at least one vinyl monomer containing at least one tertiary amino group selected from the group consisting of dialkylaminoalkyl acrylates, dialkylaminoalkyl methacrylates, N-dialkylaminoalkylacrylamides and N-dialkylaminoalkyl methacrylamides, with (a-2) another vinyl monomer copolymerizable with the monomer (a-1).

5. The composition of any one of claims 1 to 3 wherein the vinyl polymer (A) is a polymer containing a tertiary amino group obtained by reacting (a-3) a vinyl polymer containing a carboxylic anhydride group with (a-4) a compound containing both at least one tertiary amino group and at least one group having active hydrogen capable of reacting with the carboxylic anhydride group in each molecule.

6. The composition of any one of claim 1 to 3 wherein the vinyl polymer (A) is a polymer containing a basic nitrogen atom and a carboxyl group and/or a phosphate ester bond.

7. The composition of any one of claims 1 to 3 wherein the compound (B) containing both an epoxy group and a hydrolyzable silyl group is a vinyl polymer containing both an epoxy group and a hydrolyzable silyl group at a terminal position of the main polymer chain and/or a side chain.

8. The composition of any one of claims 1 to 3 wherein the compound (B) containing both an epoxy group and a hydrolyzable silyl group is at least one compound selected from the group consisting of gamma-glycidoxypropyltrialkoxysilane and gamma-glycidoxypropyltriisopropenyloxysilane.

9. The composition of claim 2 or 3 wherein the compound (C-2) containing a hydrolyzable silyl group other than the compound (B) is at least one compound selected from the group consisting of alkoxysilanes, partial hydrolyzation and condensation products of alkoxysilanes, alkenyloxysilanes, partial hydrolysis and condensation products of alkenyloxysilanes, alkoxysilanemodified resins obtained by reacting compounds containing at least two alkoxysilyl groups per molecule with polyhydric alcohols, vinyl polymers having a hydrolyzable silyl group at a terminal position of the main polymer chain and/or a side chain, alkyd resins containing a hydrolyzable silyl group and polyester resins containing a hydrolyzable silyl group.

10. The room temperature-curable resin composition of any of claims 1 to 3 wherein the vinyl monomer containing at least one tertiary amino group (a-1) is selected from the group consisting of dialkylaminoalkyl acrylates, dialkylaminoalkyl methacrylates, N-dialkylaminoalkyl acrylamides, N-dialkylaminoalkyl methacrylamides, aziridinylethyl acrylate, aziridinylethyl methacrylate, pyrrolidinylethyl acrylate, pyrrolidinylethyl methacrylate, piperidinylethyl acrylate and piperidinylethyl methacrylate.

11. The composition of any one of claims 1 to 3 wherein the vinyl polymer (A) is obtained by copolymerizing from 1 to 70% by weight of the tertiary amino group-containing vinyl monomer (a-1) with from 99 to 30% by weight of the copolymerizable vinyl monomer (a-2).

12. The composition of claim 5 wherein the vinyl polymer containing a carboxylic anhydride group (a-3) is obtained by polymerizing from 0.5 to 50% by weight of a monomer containing an acid anhydride group with from 99.5 to 50% by weight of a monomer free from a hydroxyl group and copolymerizable with the monomer containing the acid anhydride group; and wherein the vinyl polymer (A) is obtained by reacting the vinyl polymer (a-3) and the compound (a-4) in such proportions that the proportion of the active hydrogen-containing group in the compound (a-4) is about 0.5 to 3 equivalents per equivalent of the acid anhydride group of the polymer (a-3).

* * * * *

UNITED STATES PATENT AND TRADEMARK OFFICE
CERTIFICATE OF CORRECTION

PATENT NO. : 4,818,790
DATED : April 4, 1989
INVENTOR(S) : MASATAKA OOKA ET AL.

It is certified that error appears in the above-identified patent and that said Letters Patent is hereby corrected as shown below:

On the cover page, under "Inventors", delete "Hiroshi Ozawa" (second occurrence).

Claim 1, line 13 of the claim, delete "(a-3 a" and insert therefor --(a-3) a--.

Claim 2, line 13 of the claim, delete "Containing" and insert therefor --containing--.

Claim 3, line 15 of the claim, delete "teritiary" and insert therefor --tertiary--;

line 27 of the claim, "a" should be deleted;

line 28 of the claim, delete "0.001" and insert therefor --0.01--.

Claim 9, lines 7 and 8 of the claim, delete "alkoxysilanemodified" and insert therefor --alkoxysilane-modified--.

Claim 10, line 2 of the claim, after "any", insert --one--.

Signed and Sealed this

Fourteenth Day of November, 1989

*Attest:*

JEFFREY M. SAMUELS

*Attesting Officer*    *Acting Commissioner of Patents and Trademarks*